(12) United States Patent
Kuzuhara et al.

(10) Patent No.: US 11,415,800 B2
(45) Date of Patent: Aug. 16, 2022

(54) HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 17/128,417

(22) Filed: Dec. 21, 2020

(65) Prior Publication Data

US 2021/0109348 A1 Apr. 15, 2021

Related U.S. Application Data

(63) Continuation of application No. PCT/JP2019/032008, filed on Aug. 15, 2019.

(30) Foreign Application Priority Data

Aug. 27, 2018 (JP) .............................. JP2018-158695

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 13/18* (2013.01);
(Continued)

(58) Field of Classification Search
CPC ........ G02B 27/0101; G02B 2027/0123; G02B 2027/012; G02B 2027/0121; G02B 2027/0118; B60K 35/00; B60K 2370/1529
See application file for complete search history.

(56) References Cited

U.S. PATENT DOCUMENTS

| 2005/0036118 A1 | 2/2005 | Ishikura et al. |
| 2010/0182700 A1 | 7/2010 | Thomas et al. |
| (Continued) | | |

FOREIGN PATENT DOCUMENTS

| JP | 07-333408 | 12/1995 |
| JP | 2005-062530 | 3/2005 |
| (Continued) | | |

OTHER PUBLICATIONS

English translation of the International Preliminary Report on Patentability dated Mar. 4, 2021 in International Application No. PCT/JP2019/032008.

(Continued)

*Primary Examiner* — Ryan D Howard
(74) *Attorney, Agent, or Firm* — Wenderoth, Lind & Ponack, L.L.P.

(57) ABSTRACT

A head-up display for displaying an image as a virtual image to an observer includes a projection optical system that includes a lens element and a reflecting mirror. A light beam reaching a center of a viewpoint region of the observer and corresponding to a center of the virtual image is defined as a reference light beam. The lens element is inclined with respect to the reference light beam. The lens element includes an entrance surface on which light of the image is incident, an exit surface from which light of the image emerges, a first edge portion, and a second edge portion. The second edge portion is inclined so that, when light emitted from the image travels through the entrance surface, the second edge portion, and the exit surface in this order, light emerging from the exit surface reaches below a central portion of the reflecting mirror.

10 Claims, 5 Drawing Sheets

(51) Int. Cl.
  *G02B 13/18* (2006.01)
  *G02B 17/08* (2006.01)
(52) U.S. Cl.
  CPC ...... *G02B 17/08* (2013.01); *B60K 2370/1529* (2019.05); *B60K 2370/166* (2019.05); *B60K 2370/167* (2019.05); *B60K 2370/179* (2019.05); *B60K 2370/23* (2019.05); *G02B 2027/0196* (2013.01)

(56) References Cited

U.S. PATENT DOCUMENTS

| | | |
|---|---|---|
| 2017/0184843 A1 | 6/2017 | Kuzuhara et al. |
| 2018/0081174 A1 | 3/2018 | Yatsu et al. |
| 2018/0348515 A1 | 12/2018 | Kuzuhara et al. |
| 2018/0356631 A1 | 12/2018 | Kuzuhara et al. |

FOREIGN PATENT DOCUMENTS

| | | |
|---|---|---|
| JP | 2006-259174 | 9/2006 |
| JP | 2008-276059 | 11/2008 |
| JP | 2017-120388 | 7/2017 |
| JP | 2018-083593 | 5/2018 |
| TW | 201106037 | 2/2011 |
| WO | 2016/162928 | 10/2016 |
| WO | 2017/094248 | 6/2017 |

OTHER PUBLICATIONS

Extended European Search Report dated Sep. 30, 2021 in corresponding European Patent Application No. 19856265.4.
International Search Report dated Oct. 15, 2019 in International (PCT) Application No. PCT/JP2019/032008 with English translation.

HEAD-UP DISPLAY

CROSS-REFERENCE TO RELATED APPLICATIONS

The present application is a continuation of PCT/JP2019/032008 filed Aug. 15, 2019, which claims priority to Japanese Patent Application No. 2018-158695, filed on Aug. 27, 2018, the entire contents of which are incorporated herein by reference.

TECHNICAL FIELD

The present disclosure relates to a head-up display.

BACKGROUND ART

WO 2016/162928 A1 discloses a head-up display-related technique of arranging a concave lens having negative refractive power, a convex lens having positive refractive power, a rotationally asymmetric free-form surface lens, and a rotationally asymmetric free-form surface mirror side by side in this order from a screen plate.

However, in a case where a free-form surface lens is used as in WO 2016/162928 A1, there is a problem that light emitted from a liquid crystal display device is reflected by an edge surface of the free-form surface lens and stray light is generated. In order to prevent stray light, black coating on the edge surface may be considered. However, the black coating causes an increase in the manufacturing cost. Therefore, the present disclosure provides a head-up display that can prevent generation of stray light from the edge surface by a method other than black coating.

SUMMARY

The head-up display of the present disclosure is a head-up display for displaying an image as a virtual image to an observer. The head-up display includes a projection optical system for enlarging and projecting the image. The projection optical system includes a lens element and a reflecting mirror. A light beam reaching a center of a viewpoint region of the observer and corresponding to a center of the virtual image is defined as a reference light beam. The lens element is disposed to be inclined with respect to the reference light beam. The lens element includes an entrance surface on which light of the image is incident, an exit surface from which light of the image emerges, a first edge portion, and a second edge portion. The second edge portion is inclined so that, when light emitted from the image travels through the entrance surface, the second edge portion, and the exit surface in this order, light emerging from the exit surface reaches below a central portion of the reflecting mirror.

According to the head-up display in the present disclosure, the second edge portion is inclined so that stray light generated by reflection by the second edge portion reaches below the central portion of the reflecting mirror. Accordingly, it is possible to prevent the stray light generated by reflection by the second edge portion from being visually perceived by the observer.

DETAILED DESCRIPTION

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art.

Note that the inventor(s) provide the accompanying drawings and the description below so that those skilled in the art can fully understand the present disclosure, and do not intend to limit the subject matter described in claims by these drawings and description.

First Embodiment

Hereinafter, the first embodiment will be described with reference to FIGS. 1 to 3.
[1-1. Configuration]
[1-1-1. Overall Structure of Head-Up Display]

A specific embodiment and example of a head-up display 100 of the present disclosure will be described below with reference to the drawings.

Figure 1:
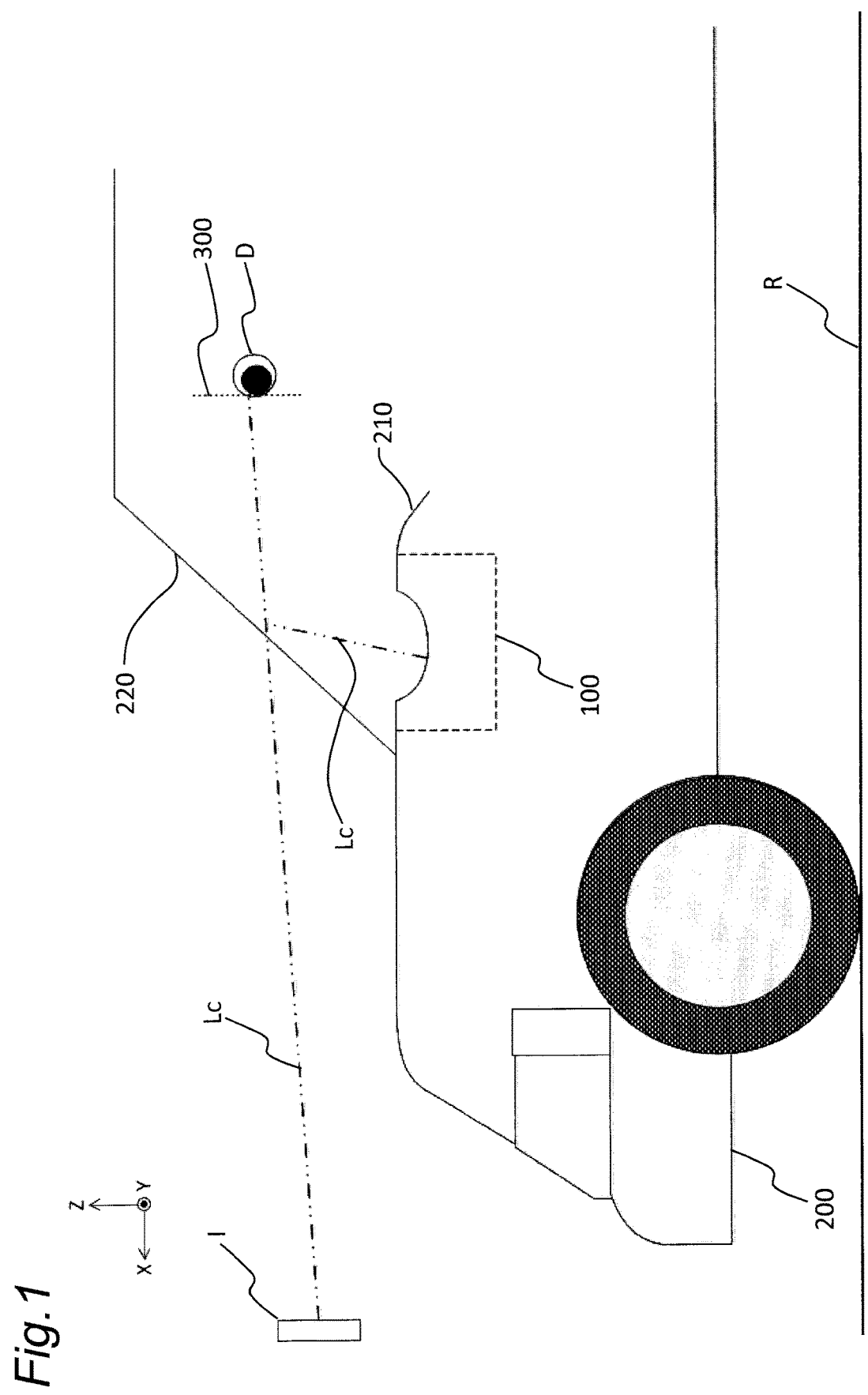
FIG. 1 is a diagram showing a cross section of a vehicle equipped with a head-up display according to a first embodiment.

FIG. 1 is a diagram showing a cross section of a vehicle 200 equipped with the head-up display 100 according to the present disclosure. As shown in FIG. 1, the head-up display 100 is disposed inside a dashboard 210 below a windshield 220 of the vehicle 200. An observer D perceives an image projected from the head-up display 100 as a virtual image I.

Figure 2:
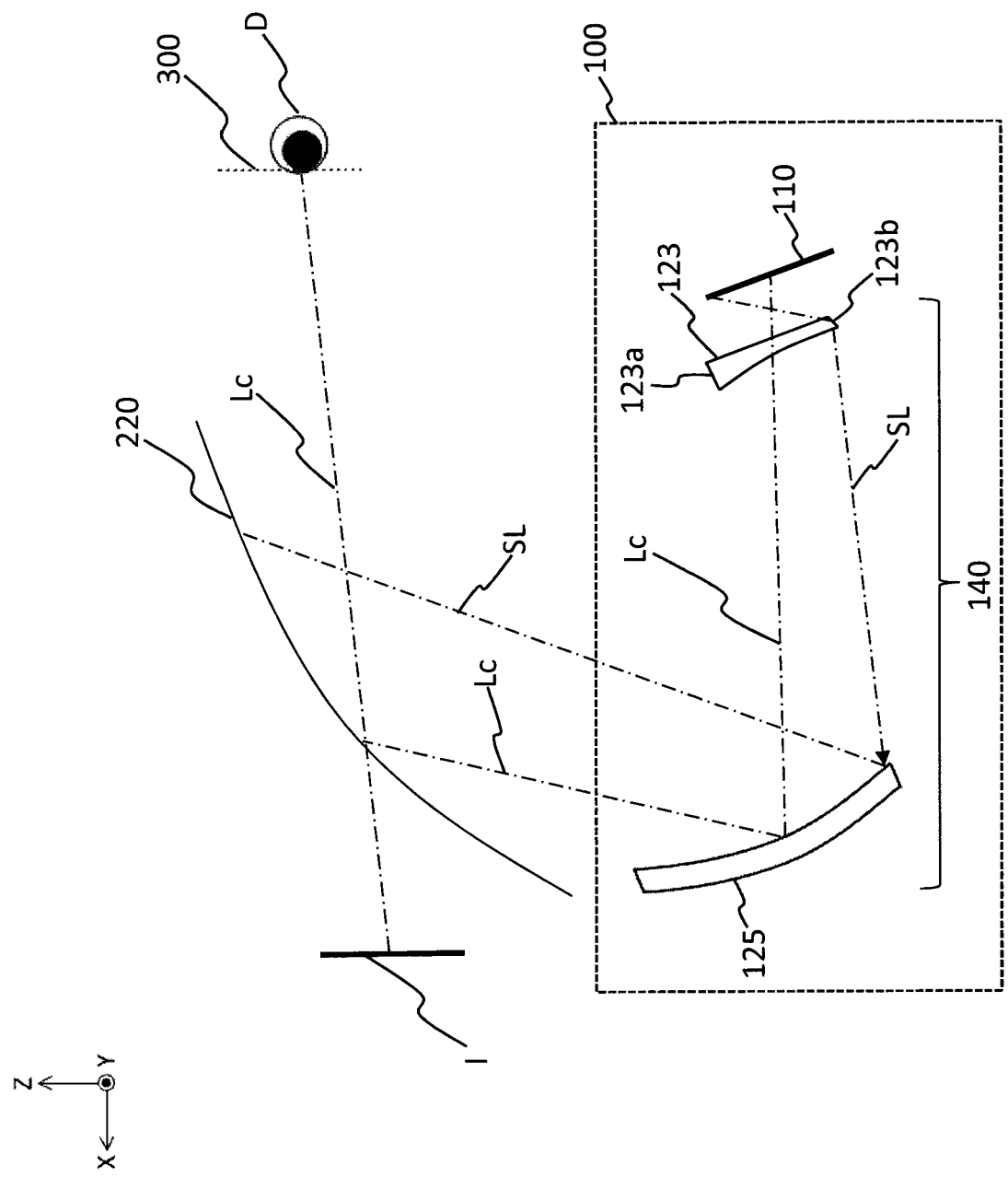
FIG. 2 is a schematic diagram showing a configuration of the head-up display according to the first embodiment.

FIG. 2 is a schematic diagram showing a configuration of the head-up display 100 according to the present embodiment. FIG. 3 is an enlarged schematic view of a free-form surface lens 123 of the head-up display 100 according to the present embodiment.

As shown in FIG. 2, the head-up display 100 includes a display device 110 and a projection optical system 140. In the head-up display 100, the display device 110 is an optical member having a diffusion characteristic, and the head-up display 100 projects an image displayed on the display device 110 onto a windshield 220 via the projection optical system 140. Projected light is reflected by the windshield 220 and guided to a viewpoint region 300 of the observer D. In this manner, the head-up display 100 makes the observer D visually perceive the virtual image I. Here, a viewpoint is a principle point of an eye of the observer D in a case where the eye is considered as a lens, and the viewpoint region 300 is a region where the viewpoint of the observer D which allows the observer D to visually perceive the virtual image I completely is positioned.

Here, in the present disclosure, a forward direction is a direction from the observer D toward the windshield 220 of the vehicle 200. A rearward direction is an opposite direction from the forward direction. A downward direction is a direction from the vehicle 200 toward the road surface R on which the vehicle 200 travels. An upward direction is an opposite direction from the downward direction.

As shown in FIG. 2, among light beams emitted from the display device 110 and reaching a center of the viewpoint region 300, a light beam that passes through a central portion of the virtual image I and reaches the center of the viewpoint region 300 is defined as a reference light beam Lc. That is, when viewed from the observer D, the reference light beam Lc corresponds to an optical path from a center of the virtual image I to the viewpoint of the observer D. Actually, the reference light beam Lc visually perceived by the observer D is a light beam that reaches the observer D from the display device 110 via the optical system. For this reason, light beams corresponding to the reference light beam Lc emitted from the center of the virtual image I and reaching the observer D from the display device 110 each are also expressed as the reference light beam Lc. Further, the optical paths corresponding to these light beams are similarly expressed as the reference light beam Lc. However, it is assumed that the viewpoint of the observer D is at the center of the viewpoint region 300.

The display device 110 displays a display image under the control of a control unit such as a CPU (not shown). As the display device 110, for example, a liquid crystal display device with a backlight, an organic light-emitting diode, a plasma display, or the like can be used. Further, as the display device 110, a screen that diffuses or reflects light and a projector or a scanning laser may be used to generate an image. The display device 110 can display various pieces of information such as road progress guidance display, a distance to a vehicle in front, a remaining amount of a vehicle battery, and a current vehicle speed. Further, the display device 110 can electronically distort an image in advance according to the distortion generated in the projection optical system 140 or the windshield 220 or the position of the observer D acquired by a camera (not shown), so as to allow the observer D to visually perceive the excellent virtual image I. Further, the display device 110 can display displayed pixels of a plurality of wavelengths as if the displayed pixels are shifted depending on their respective display positions in advance according to the chromatic aberration generated in the projection optical system 140, so as to allow the observer D to visually perceive the excellent virtual image I.

The projection optical system 140 includes a free-form surface lens 123 as a lens element having negative power and a free-form surface mirror 125 as a reflecting mirror having positive power. Here, having the negative power means having a diverging action, and having the positive power means having a converging action. The projection optical system 140 projects an image refracted by the free-form surface lens 123 onto the windshield 220 by reflecting the image on the free-form surface mirror 125.

[1-1-2. Configuration of Lens Element]

In the present embodiment, the free-form surface lens 123 is disposed to be inclined with respect to the reference light beam Lc so that an exit surface of the free-form surface lens 123 faces downward in a cross-sectional view of the vehicle 200 as shown in FIG. 2 in order to prevent stray light of sunlight.

Further, merely by inclining the free-form surface lens 123 in this way, display light from the display device 110 is reflected by a second edge portion 123b, and stray light is generated. In view of the above, in the present embodiment, the free-form surface lens 123 is formed such that a region of the second edge portion 123b is smaller than a region of a first edge portion 123a. By forming the free-form surface lens 123 in this way, the region of the second edge portion 123b becomes smaller, and stray light generated by the display light of the display device 110 reflected by the second edge portion 123b can be suppressed.

Figure 3:
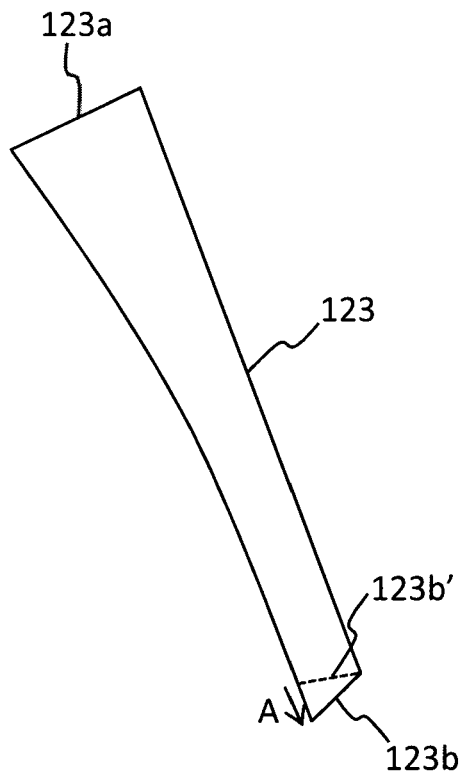
FIG. 3 is an enlarged schematic view of a free-form surface lens of the head-up display according to the first embodiment.

Furthermore, in the present embodiment, as shown in FIG. 3, a lower portion of the exit surface of the free-form surface lens 123 is extended in a direction of an arrow A, and a surface of the second edge portion 123b is inclined in a direction away from the reference light beam Lc more than a surface of a conventional second edge portion 123b'.

Further, in the present embodiment, the second edge portion 123b has specularity. Therefore, light incident on the second edge portion 123b from the display device 110 is not diffused, and optical paths contributing to stray light can be limited. Further, in a case where sunlight is focused on the second edge portion 123b through the free-form surface mirror 125 as in the case where the second edge portion 123b is black-coated, the second edge portion 123b can be prevented from being heated.

By inclining the second edge portion 123b in this manner, as shown in FIG. 2, when light emitted from the display device 110 travels through the entrance surface of the free-form surface lens 123, the second edge portion 123b, and the exit surface of the free-form surface lens 123 in this order, stray light SL emerging from the exit surface of the free-form surface lens 123 reaches below the central portion of the free-form surface mirror 125. As a result, the stray light SL reaches an upper portion of the windshield 220 and is not visually perceived by the observer D. Here, the central portion of the free-form surface mirror 125 is a region that is ⅔ of a size of the free-form surface mirror 125 around the center of the free-form surface mirror 125.

An inclination angle of the second edge portion 123b may be set so that the stray light SL emerging from the exit surface of the free-form surface lens 123 travels below the free-form surface mirror 125 without reaching a reflecting surface of the free-form surface mirror 125.

As described above, in the present embodiment, the exit surface of the free-form surface lens 123 on which emitted light from the display device 110 is incident is disposed so as to be inclined downward, the region of the second edge portion 123b is made smaller than the region of the first edge portion 123a, and the surface of the second edge portion 123b is inclined so that the reflected light from the second edge portion 123b reaches below the central portion of the free-form surface mirror 125. Therefore, it is possible to prevent the stray light SL generated by light emitted from the display device 110 and reflected by the second edge portion 123b from being visually perceived by the observer D.

[1-2. Advantageous Effect and the Like]

The head-up display 100 as an example of the head-up display according to the first embodiment is the head-up display 100 for displaying the image as the virtual image I to the observer D. The head-up display 100 includes the projection optical system 140 for enlarging and projecting the image. The projection optical system 140 includes the free-form surface lens 123 as the lens element. A light beam reaching the center of the viewpoint region 300 of the observer D and corresponding to the center of the virtual image I is defined as the reference light beam Lc. The free-form surface lens 123 is disposed to be inclined with respect to the reference light beam Lc. The free-form surface lens 123 includes the entrance surface on which light of the image is incident, the exit surface from which light of the image emerges, the first edge portion 123a, and the second edge portion 123b. The second edge portion 123b is inclined so that, when light emitted from the image travels through the entrance surface, the second edge portion 123b, and the exit surface in this order, light emerging from the exit surface reaches below the central portion of the free-form surface mirror 125 as the reflecting mirror.

According to the head-up display 100 of the first embodiment, the region of the second edge portion 123b is made smaller than the region of the first edge portion 123a, so that the stray light generated by reflection by the second edge portion 123b can be reduced. Further, the second edge portion 123b is inclined so that the stray light generated by reflection by the second edge portion 123b reaches below the central portion of the free-form surface mirror 125. As a result, it is possible to prevent the stray light generated by reflection by the second edge portion 123b from being visually perceived by the observer D.

Second Embodiment

Next, a second embodiment will be described with reference to FIG. 4.

[2-1. Configuration]

Figure 4:
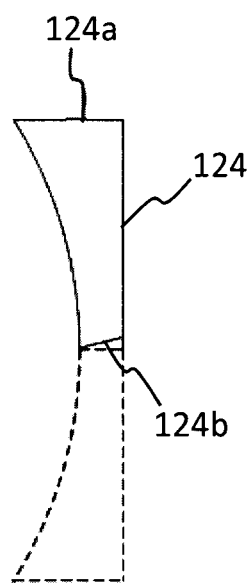
FIG. 4 is an enlarged schematic view of a lens of the head-up display according to a second embodiment.

FIG. 4 is a schematic diagram showing a configuration of a lens element in the head-up display 100 according to the second embodiment. As shown in FIG. 4, in the head-up display 100 according to the present embodiment, a lens 124 is used as the lens element instead of the free-form surface lens 123. The lens 124 includes an exit surface that is a curved surface having a constant curvature.

The lens 124 includes an upper first edge portion 124a and a lower second edge portion 124b. As to the lens 124, a lens that has a curved surface having a constant curvature as an exit surface is divided into two equal portions, and only an upper half thereof is used as the lens 124. Also in the present embodiment, the exit surface of the lens 124 on which emitted light from the display device 110 is incident is inclined downward, and a region of the second edge portion 124b is made smaller than a region of the first edge portion 124a. Further, the second edge portion 124b is inclined so that the stray light generated by reflection by the second edge portion 124b reaches below the central portion of the free-form surface mirror 125. Here, the lens 124 is not limited to a lens corresponding an upper half of two equal portions into which a lens with an exit surface being a curved surface having a constant curvature is divided. An upper side of the lens 124 may be used in any ratio so that the region of the second edge portion 124b becomes smaller than the region of the first edge portion 124a.

As described above, in the present embodiment, the exit surface of the lens 124 on which emitted light from the display device 110 is incident is disposed so as to be inclined downward, the region of the second edge portion 124b is made smaller than the region of the first edge portion 124a, and the surface of the second edge portion 124b is inclined so that reflected light from the second edge portion 124b reaches below the central portion of the free-form surface mirror 125. Therefore, it is possible to prevent the stray light SL generated by light emitted from the display device 110 and reflected by the second edge portion 124b from being visually perceived by the observer D.

Further, in the present embodiment, the second edge portion 124b has specularity. Therefore, light incident on the second edge portion 123b from the display device 110 is not diffused, and optical paths contributing to stray light can be limited. Further, in a case where sunlight is focused on the second edge portion 124b through the free-form surface mirror 125 as in the case where the second edge portion 124b is black-coated, the second edge portion 124b can be prevented from being heated.

[2-2. Advantageous Effect and the Like]

The head-up display 100 as an example of the head-up display according to the second embodiment is the head-up display 100 for displaying the image as the virtual image I to the observer D. The head-up display 100 includes the projection optical system 140 for enlarging and projecting the image. The projection optical system 140 includes the lens 124 as the lens element. A light beam reaching the center of the viewpoint region 300 of the observer D and corresponding to the center of the virtual image I is defined as the reference light beam Lc. The lens 124 is disposed to be inclined with respect to the reference light beam Lc. The lens 124 includes the entrance surface on which light of the image is incident, the exit surface from which light of the image emerges, the first edge portion 124a, and the second edge portion 124b. The second edge portion 124b is inclined so that, when light emitted from the image travels through the entrance surface, the second edge portion 124b, and the exit surface in this order, light emerging from the exit surface reaches below the central portion of the free-form surface mirror 125 as the reflecting mirror.

According to the head-up display 100 of the second embodiment, the region of the second edge portion 124b is made smaller than the region of the first edge portion 124a, so that the stray light generated by reflection by the second edge portion 124b can be reduced. Further, the second edge portion 124b is inclined so that the stray light generated by reflection by the second edge portion 124b reaches below the central portion of the free-form surface mirror 125. As a result, it is possible to prevent the stray light generated by reflection by the second edge portion 124b from being visually perceived by the observer D.

Third Embodiment

Next, a third embodiment will be described with reference to FIG. 5.

[3-1. Configuration]

Figure 5:
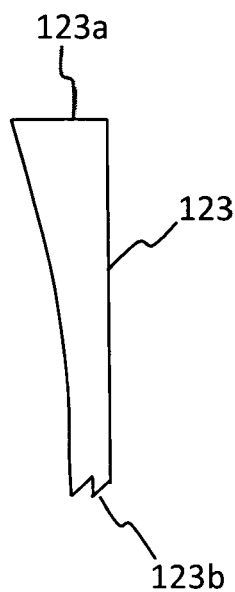
FIG. 5 is an enlarged schematic view of the lens of the head-up display according to a third embodiment.

FIG. 5 is a schematic diagram showing a configuration of a lens element in the head-up display 100 according to the third embodiment. As shown in FIG. 5, in the head-up display 100 of the present embodiment, the free-form surface lens 123 is used as the lens element. However, the second edge portion 123b has a discontinuous inclined shape.

The free-form surface lens 123 includes the upper first edge portion 123a and the lower second edge portion 123b. Also in the present embodiment, the lens 123 is disposed in a manner that the exit surface is inclined downward, and the region of the second edge portion 123b is made smaller than the region of the first edge portion 123a. Further, the second edge portion 123b is inclined so that the stray light generated by reflection by the second edge portion 123b reaches below a central portion of the free-form surface mirror 125. Then, in the present embodiment, an inclined shape of the second edge portion 123b is formed of a plurality of discontinuous inclined shapes.

By configuring the second edge portion 123b in this way, a size of a surface in each inclined shape of the second edge portion 123b becomes smaller than the second edge portion 123b of the first embodiment, and the stray light generated by reflection by the second edge portion 123b can be further reduced.

Further, in the present embodiment, the second edge portion 123b has specularity. Therefore, light incident on the second edge portion 123b from the display device 110 is not diffused, and optical paths contributing to stray light can be limited. Further, in a case where sunlight is focused on the second edge portion 123b through the free-form surface mirror 125 as in the case where the second edge portion 123b is black-coated, the second edge portion 123b can be prevented from being heated.

As described above, in the present embodiment, the exit surface of the lens 123 on which emitted light from the display device 110 is incident is disposed so as to be inclined downward, the region of the second edge portion 123b is made smaller than the region of the first edge portion 123a, and the surface of the second edge portion 123b is inclined so that reflected light from the second edge portion 123b reaches below the central portion of the free-form surface mirror 125. Moreover, the inclined shape of the second edge portion 123b is formed of the plurality of discontinuous inclined shapes. Therefore, it is possible to prevent the stray light SL generated by light emitted from the display device 110 and reflected by the second edge portion 124b from being visually perceived by the observer D.

[3-2. Advantageous Effect and the Like]

The head-up display 100 as an example of the head-up display according to the third embodiment is the head-up display 100 for displaying the image as the virtual image I to the observer D. The head-up display 100 includes the projection optical system 140 for enlarging and projecting the image. The projection optical system 140 includes the free-form surface lens 123 as the lens element. A light beam reaching the center of the viewpoint region 300 of the observer D and corresponding to the center of the virtual image I is defined as the reference light beam Lc. The free-form surface lens 123 is disposed to be inclined with respect to the reference light beam Lc. The free-form surface lens 123 includes the entrance surface on which light of the image is incident, the exit surface from which light of the image emerges, the first edge portion 123a, and the second edge portion 123b. The second edge portion 123b is inclined so that, when light emitted from the image travels through the entrance surface, the second edge portion 123b, and the exit surface in this order, light emerging from the exit surface reaches below the central portion of the free-form surface mirror 125 as the reflecting mirror. Further, the second edge portion 123b has the discontinuous inclined shape.

According to the head-up display 100 of the third embodiment, the region of the second edge portion 123b is made smaller than the region of the first edge portion 123a, and has the discontinuous inclined shape, so that the stray light generated by reflection by the second edge portion 123b can be reduced. Further, the second edge portion 123b has the inclined shape so that the stray light generated by reflection by the second edge portion 123b reaches below the central portion of the free-form surface mirror 125. As a result, it is possible to prevent the stray light generated by reflection by the second edge portion 123b from being visually perceived by the observer D.

Fourth Embodiment

Next, a fourth embodiment will be described with reference to FIG. 6.

[4-1. Configuration]

Figure 6:
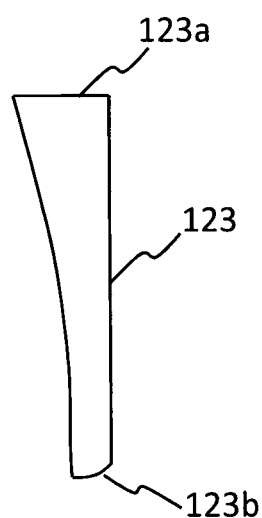
FIG. 6 is an enlarged schematic view of the lens of the head-up display according to a fourth embodiment.

FIG. 6 is a schematic diagram showing a configuration of a lens element in the head-up display 100 according to the fourth embodiment. As shown in FIG. 6, in the head-up display 100 of the present embodiment, the free-form surface lens 123 is used as the lens element. However, the second edge portion 123b has a curved surface portion.

The free-form surface lens 123 includes the upper first edge portion 123a and the lower second edge portion 123b. Also in the present embodiment, the lens 123 is disposed in a manner that the exit surface is inclined downward, and the region of the second edge portion 123b is made smaller than the region of the first edge portion 123a. Further, the second edge portion 123b is inclined so that the stray light generated by reflection by the second edge portion 123b reaches below the central portion of the free-form surface mirror 125. Then, in the present embodiment, the inclined shape of the second edge portion 123b is formed of a curved surface portion.

The inclined shape of the second edge portion 123b can also be formed of the curved surface portion as described above, and stray light generated by reflection by the second edge portion 123b can be made to reach below the central portion of the free-form surface mirror 125.

Further, in the present embodiment, the second edge portion 123b has specularity. Therefore, light incident on the second edge portion 123b from the display device 110 is not diffused, and optical paths contributing to stray light can be limited. Further, in a case where sunlight is focused on the second edge portion 123b through the free-form surface mirror 125 as in the case where the second edge portion 123b is black-coated, the second edge portion 123b can be prevented from being heated.

As described above, in the present embodiment, the exit surface of the lens 123 on which emitted light from the display device 110 is incident is disposed so as to be inclined downward, the region of the second edge portion 123b is made smaller than the region of the first edge portion 123a, and the surface of the second edge portion 123b is inclined so that reflected light from the second edge portion 123b reaches below the central portion of the free-form surface mirror 125. Moreover, the inclined shape of the second edge portion 123b is formed of the curved surface portion. Therefore, it is possible to prevent the stray light SL generated by light emitted from the display device 110 and reflected by the second edge portion 123b from being visually perceived by the observer D.

[4-2. Advantageous Effect and the Like]

The head-up display 100 as an example of the head-up display according to the fourth embodiment is the head-up display 100 for displaying the image as the virtual image I to the observer D. The head-up display 100 includes the projection optical system 140 for enlarging and projecting the image. The projection optical system 140 includes the free-form surface lens 123 as the lens element. A light beam reaching the center of the viewpoint region 300 of the observer D and corresponding to the center of the virtual image I is defined as the reference light beam Lc. The free-form surface lens 123 is disposed to be inclined with respect to the reference light beam Lc. The free-form surface lens 123 includes the entrance surface on which light of the image is incident, the exit surface from which light of the image emerges, the first edge portion 123a, and the second edge portion 123b. The second edge portion 123b is inclined so that, when light emitted from the image travels through the entrance surface, the second edge portion 123b, and the exit surface in this order, light emerging from the exit surface reaches below the central portion of the free-form surface mirror 125 as the reflecting mirror. Further, the second edge portion 123b has the curved surface portion.

According to the head-up display 100 of the fourth embodiment, the region of the second edge portion 123b is made smaller than the region of the first edge portion 123a, so that the stray light generated by reflection by the second edge portion 123b can be reduced. Further, the second edge portion 123b has the inclined shape given by the curved surface portion so that the stray light generated by reflection by the second edge portion 123b reaches below the central portion of the free-form surface mirror 125. As a result, it is possible to prevent the stray light generated by reflection by the second edge portion 123b from being visually perceived by the observer D.

Fifth Embodiment

Next, a fifth embodiment will be described with reference to FIG. 7.

[5-1. Configuration]

Figure 7:
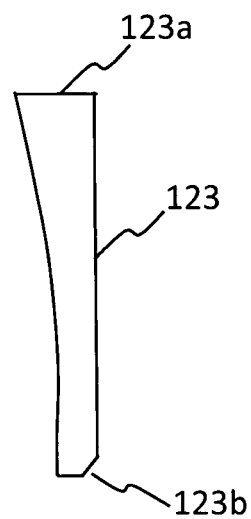
FIG. 7 is an enlarged schematic view of the lens of the head-up display according to a fifth embodiment.

FIG. 7 is a schematic diagram showing a configuration of a lens element in the head-up display 100 according to the fifth embodiment. As shown in FIG. 7, in the head-up display 100 of the present embodiment, the free-form surface lens 123 is used as the lens element. However, the second edge portion 123b includes a plurality of flat surface portions, and inclination angles of the flat surface portions are partially different.

The free-form surface lens 123 includes the upper first edge portion 123a and the lower second edge portion 123b. Also in the present embodiment, the lens 123 is disposed in a manner that the exit surface is inclined downward, and the region of the second edge portion 123b is made smaller than the region of the first edge portion 123a. Further, the second edge portion 123b is inclined so that the stray light generated by reflection by the second edge portion 123b reaches below the central portion of the free-form surface mirror 125. Then, in the present embodiment, the inclined shape of the second edge portion 123b is formed of the plurality of flat surface portions, and the inclination angles of the flat surface portions are partially different.

The inclined shape of the second edge portion 123b can also be formed of the plurality of flat surface portions having partially different inclination angles as described above, and stray light generated by reflection by the second edge portion 123b can be made to reach below the central portion of the free-form surface mirror 125.

Further, in the present embodiment, the second edge portion 123b has specularity. Therefore, light incident on the second edge portion 123b from the display device 110 is not diffused, and optical paths contributing to stray light can be limited. Further, in a case where sunlight is focused on the second edge portion 123b through the free-form surface mirror 125 as in the case where the second edge portion 123b is black-coated, the second edge portion 123b can be prevented from being heated.

As described above, in the present embodiment, the exit surface of the lens 123 on which emitted light from the display device 110 is incident is disposed so as to be inclined downward, the region of the second edge portion 123b is made smaller than the region of the first edge portion 123a, and the surface of the second edge portion 123b is inclined so that reflected light from the second edge portion 123b reaches below the central portion of the free-form surface mirror 125. Moreover, the inclined shape of the second edge portion 123b is formed of the plurality of flat surface portions having partially different inclination angles. Therefore, it is possible to prevent the stray light SL generated by light emitted from the display device 110 and reflected by the second edge portion 123b from being visually perceived by the observer D.

[5-2. Advantageous Effect and the Like]

The head-up display 100 as an example of the head-up display according to the fifth embodiment is the head-up display 100 for displaying the image as the virtual image I to the observer D. The head-up display 100 includes the projection optical system 140 for enlarging and projecting the image. The projection optical system 140 includes the free-form surface lens 123 as the lens element. A light beam reaching the center of the viewpoint region 300 of the observer D and corresponding to the center of the virtual image I is defined as the reference light beam Lc. The free-form surface lens 123 is disposed to be inclined with respect to the reference light beam Lc. The free-form surface lens 123 includes the entrance surface on which light of the image is incident, the exit surface from which light of the image emerges, the first edge portion 123a, and the second edge portion 123b. The second edge portion 123b is inclined so that, when light emitted from the image travels through the entrance surface, the second edge portion 123b, and the exit surface in this order, light emerging from the exit surface reaches below the central portion of the free-form surface mirror 125 as the reflecting mirror. Further, the second edge portion 123b includes the plurality of flat surface portions having partially different inclination angles.

According to the head-up display 100 of the fifth embodiment, the region of the second edge portion 123b is made smaller than the region of the first edge portion 123a, so that the stray light generated by reflection by the second edge portion 123b can be reduced. Further, the second edge portion 123b has the inclined shape given by the plurality of flat surface portions having partially different inclination angles so that the stray light generated by reflection by the second edge portion 123b reaches below the central portion of the free-form surface mirror 125. As a result, it is possible to prevent the stray light generated by reflection by the second edge portion 123b from being visually perceived by the observer D.

Outline of Embodiment (1) The head-up display of the present disclosure is a head-up display for displaying an image as a virtual image to an observer. The head-up display includes a projection optical system for enlarging and projecting the image. The projection optical system includes a lens element and a reflecting mirror. A light beam reaching a center of a viewpoint region of the observer and corresponding to a center of the virtual image is defined as a reference light beam, the lens element is disposed to be inclined with respect to the reference light beam. The lens element includes an entrance surface on which light of the image is incident, an exit surface from which light of the image emerges, a first edge portion, and a second edge portion. The second edge portion is inclined so that, when light emitted from the image travels through the entrance surface, the second edge portion, and the exit surface in this order, light emerging from the exit surface reaches below a central portion of the reflecting mirror.

According to the head-up display of the present disclosure, the second edge portion is inclined so that stray light generated by reflection by the second edge portion reaches below the central portion of the reflecting mirror. Accordingly, it is possible to prevent the stray light generated by reflection by the second edge portion from being visually perceived by the observer.

(2) In the head-up display of (1), the lens element has a free-form surface shape. Therefore, it is possible to allow the observer to perceive a high-quality image as a virtual image while the stray light generated by reflection by the second edge portion is prevented from being visually perceived by the observer.

(3) In the head-up display of (1) or (2), the second edge portion is formed of a region smaller than the first edge portion. Therefore, it is possible to reduce stray light generated by reflection by the second edge portion and prevent the stray light from being visually perceived by the observer.

(4) In the head-up display according to any one of (1) to (3), the second edge portion has specularity. Therefore, it is possible to prevent the second edge portion from being heated as in the case where the second edge portion is black coated.

(5) In the head-up display according to any one of (1) to (4), the second edge portion has a discontinuous inclined shape. Therefore, it is possible to reduce stray light generated by reflection by the second edge portion, and, since the second edge portion is inclined so that the stray light generated by reflection by the second edge portion reaches below the central portion of the reflecting mirror, it is possible to prevent the stray light from being visually perceived by the observer.

(6) In the head-up display of any one of (1) to (5), the second edge portion has a curved surface portion. Therefore, the second edge portion can be inclined so that stray light generated by reflection by the second edge portion reaches below the central portion of the reflecting mirror, and it is possible to prevent the stray light from being visually perceived by the observer.

(7) In the head-up display of any one of (1) to (6), the second edge portion includes portions with different inclination angles. Therefore, the second edge portion can be inclined so that stray light generated by reflection by the second edge portion reaches below the central portion of the reflecting mirror, and it is possible to prevent the stray light from being visually perceived by the observer.

(8) In the head-up display of any one of (1) to (7), the second edge portion includes a plurality of flat surface portions. Therefore, the second edge portion can be inclined so that stray light generated by reflection by the second edge portion reaches below the central portion of the reflecting mirror, and it is possible to prevent the stray light from being visually perceived by the observer.

(9) In the head-up display of any one of (1) to (8), light emerging from the exit surface reaches below the reflecting mirror when traveling through the entrance surface, the second edge portion, and the exit surface in this order. Therefore, it is possible to prevent stray light from being visually perceived by the observer.

The present disclosure can be applied to a display device such as a liquid crystal display, and a head-up display using a projection optical system such as a lens element. Specifically, the present disclosure is applicable to a head-up display for a vehicle and the like.

What is claimed is:

1. A head-up display for displaying an image as a virtual image, the head-up display comprising:
   a display device configured to display the image; and
   a projection optical system for enlarging and projecting the image, wherein
   the projection optical system comprises a lens element and a reflecting mirror,
   a light beam corresponding to a center of the virtual image is defined as a reference light beam,
   the lens element comprises an entrance surface on which light of the image displayed by the display device is incident, an exit surface from which light of the image emerges, a first edge portion above the reference light beam, and a second edge portion below the reference light beam, and
   the lens element is disposed to be inclined with respect to the reference light beam to allow the exit surface to face downward,
   the second edge portion is inclined so that, when light emitted from an upper end of the display device travels through the entrance surface, the second edge portion, and the exit surface in this order, light emerging from the exit surface reaches and is reflected below a central portion of the reflecting mirror and light reflected below the central portion of the reflecting mirror reaches outside a viewpoint region of an observer.

2. The head-up display according to claim 1, wherein the central portion of the reflecting mirror is a region of ⅔ of a size of the reflecting mirror around a center of the reflecting mirror.

3. The head-up display according to claim 1, wherein the lens element has a free-form surface shape.

4. The head-up display according to claim 1, wherein the second edge portion is formed of a region smaller than the first edge portion.

5. The head-up display according to claim 1, wherein the second edge portion has specularity.

6. The head-up display according to claim 1, wherein the second edge portion has a discontinuous inclined shape.

7. The head-up display according to claim 1, wherein the second edge portion has a curved surface portion.

8. The head-up display according to claim 1, wherein the second edge portion comprises portions with different inclination angles.

9. The head-up display according to claim 1, wherein the second edge portion comprises a plurality of flat surface portions.

10. The head-up display according to claim 1, wherein the light reflected below the central portion of the reflecting mirror reaches an upper portion of a windshield of a vehicle, the upper portion being outside the viewpoint region of the observer.

* * * * *